June 3, 1952 J. R. PETTIGROVE 2,598,827
MUD DENSITY MEASURING DEVICE
Filed Sept. 3, 1946 3 Sheets-Sheet 1

INVENTOR.
J. R. PETTIGROVE
BY Hudson & Young
ATTORNEYS

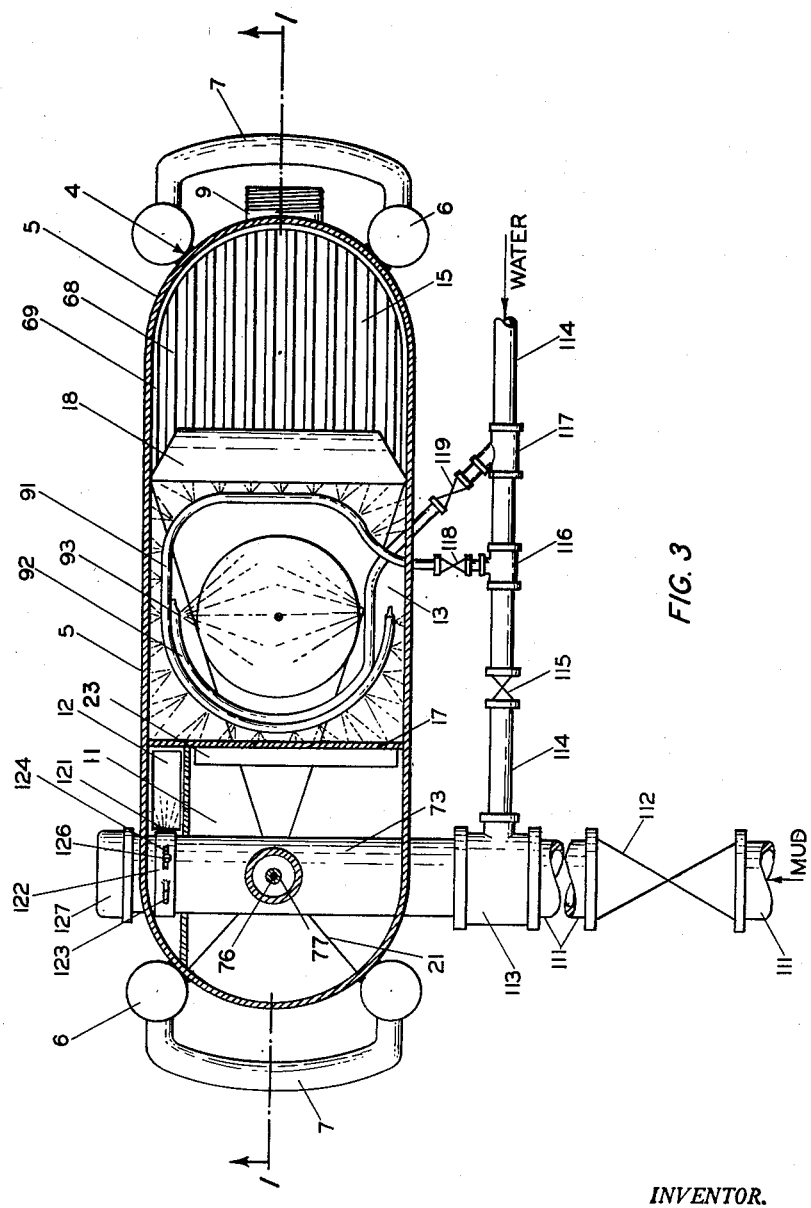

Patented June 3, 1952

2,598,827

UNITED STATES PATENT OFFICE 2,598,827

MUD DENSITY MEASURING DEVICE

John R. Pettigrove, Beaumont, Tex., assignor to Phillips Petroleum Company, a corporation of Delaware Application September 3, 1946, Serial No. 694,563

8 Claims. (Cl. 73—33)

This invention relates to means for determining the density of a liquid. In one specific aspect it relates to means for determining and recording the density of drilling mud. In another specific aspect it relates to the construction of an apparatus for weighing drilling mud, and do so automatically without interruption due to accumulation of caked mud on the apparatus, and without error due to the inertia of the mud as it passes through the apparatus.

In the prior art difficulty has been experienced in devices for determining and recording the density of drilling mud due to accumulation of clay or other solid matter deposited on certain portions of the apparatus by the drilling mud. For example, the accumulation of mud on the displacement member results in changes in its weight and volume, which while sometimes somewhat compensating, in most cases results in an error in weighing the mud. Accumulation of a layer of mud on the wall of the chamber in which the displacement member hangs often results in friction with the displacement member and error. The mud valves, especially the outlet valve on the balance tank, or operating bucket, tend to be plugged by deposits of mud, especially when the flow of mud is stopped for any reason. I have found that the flow of mud should never be stopped, even in a pipe, because while a small flow of the mud will prevent the deposit of clay, even a momentary stopping of flow will cause a rapid deposit of clay from the mud. Because of these enumerated difficulties of the prior art I do not know of any mud weighing device on the market, with the exception of the present invention, which will operate over long periods of time with accuracy and without periodic cleaning or scrubbing out by hand, even though many of them are provided with water sprays which operate at certain times in the cycle in a vain effort to keep the device from accumulating clay. Another difficulty in the prior art devices is that the single chamber ones do not give a steady reading due to splashing of entering mud and in the double chamber devices the drilling mud in filling the chamber containing the displacement member tends by inertia to buoy up the displacement member so that it rides higher than it should, and because of the high viscosity of the mud in many instances the displacement member can not regain its proper level in time to give a recording.

One object of the present invention is to provide a mud weighing device which avoids all the above enumerated disadvantages of the prior art.

Another object is to provide a suitable, relatively cheap and simple, density recorder for liquids.

A further object is to provide a mud weighing device for drilling mud which is automatically self-cleaning.

Another object is to provide a mud weighing device in which the flow of mud is never completely arrested, even in the inlet pipe, or at the outlet valve of the operating bucket.

Another object is to provide means whereby the drilling mud entering the chamber containing the displacement member does not sweep the displacement member to one side of the chamber and does not buoy up the displacement member at the critical time when measurements are being made.

Numerous other objects and advantages will be apparent to those skilled in the art upon reading the accompanying specification, claims and drawings.

In the drawings

Figure 3 is a plan sectional view of the embodiment of the invention shown in Figure 1 taken along the line 3—3 looking in the direction indicated.

Figure 1:
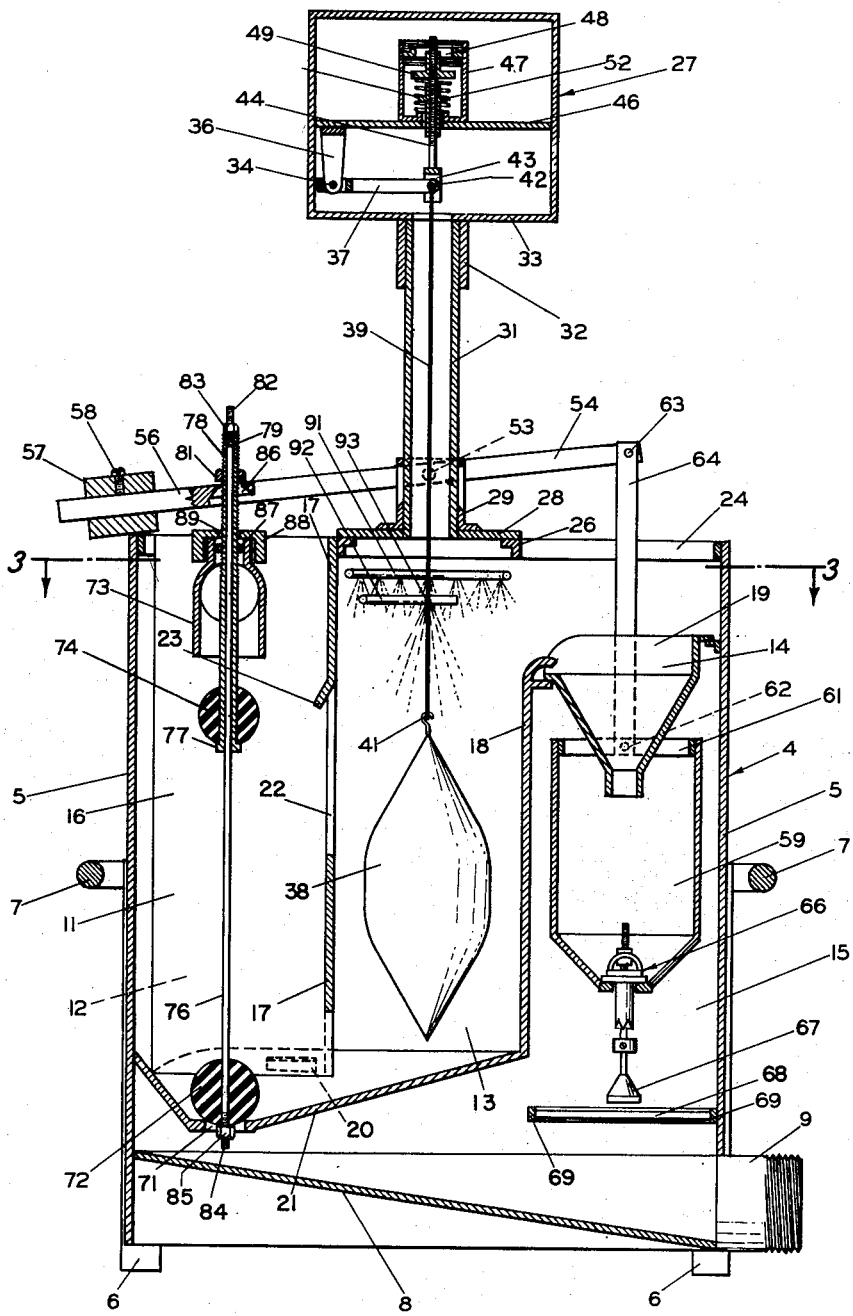
Figure 1 is an elevational cross sectional view taken along the line 1—1 of Figure 3, looking in the direction indicated, showing an embodiment of the present invention.

In Figure 1 is shown an assembled mud weighing device embodying the present invention and generally designated as 4.

Mud weighing device 4 comprises a mud tank 5 supported, if desired, on a number of legs 6 and provided, if desired, with handles 7. Tank 5 has a bottom 8 to which is connected a discharge pipe or outlet 9. A hose or pipe may be connected to 9 carrying the mud off and discharging the same into a mud pit (not shown) or other place where it will not be in the way. So far as the operation of the mud weighing device is concerned, however, bottom 8 and outlet 9 could be eliminated.

Tank 5 is divided into five compartments numbered 11, 12, 13, 14 and 15 by means of partitions 16, 17, 18, funnel 19 and the common bottom 21 of chambers 11, 12 and 13. Bottom 21 is provided with a hole 20 connecting chambers 12 and 15. Partition 17 is provided with a window or opening 22 connecting chambers 11 and 13 and part of the partition of 17 directly above window is bent so that it projects into chamber 11 at 23 as shown. Chambers 11 and 13 are also connected by the space under the lower end of partition 17.

A reinforcing frame 24 may be provided at the top of tank 5 and bridge means 26 is provided extending across tank 5 to support the recording instrument generally designated as 27. Obviously a number of alternative constructions suggest themselves, but for purposes of illustration the following construction is shown because it is preferred:

To bridge 26 is attached a plate 28 and attached to plate 28 by means of sleeve 29 is a pipe or hollow column 31. Instrument 27 is secured to column 31 by means of collar 32 and box 33. Obviously these various parts may be secured together by welding or threads, welding being the preferred construction.

Instrument 27 is any one of the usual recording instruments containing a clock driving a sheet of paper on which the record is made (clock and paper not shown) and a recording arm (not shown), for making marks on the paper, is actuated by the turning of pin 34 mounted in bracket 36. Pin 34 is rigidly mounted in lever arm 37, lever arm 37 pivots around pin 34 and bracket 36.

Suspended from the other end of lever arm 37 is a displacement member 38, which hangs in the chamber 13. Displacement member 38 is preferably made from cast commercially bronze, and preferably is made in the somewhat streamline shape shown, and out of one or more hollow pieces. Preferably the outer surface of 38 is finished rather smooth in order to make the deposit of mud less and the removal of mud easier. In most instances, 38 would be hollow. However, 38 may be made solid and of wood, aluminum, magnesium or other materials without departing from the present invention. Displacement member 38 may be suspended from lever 37 by any suitable means, such as a chain, or wire 39, provided with suitable fastening 41 and 42 at each end.

Fastening, or pivot, 42 is also connected to yoke 43 which is supported by weighing rod 44. Weighing rod 44 is threaded and extends up through partition 46 in box 33 into spring chamber 47.

Spring chamber 47 may be cylindrical and internally threaded. An upper stop member 48 is threaded into chamber 47 and may be set at the point it is desired to stop upward movement of spring contacting member 49. Member 49 is threaded on rod 44 so that it may be positioned to give the desired compression on spring 51. Also threaded on rod 44 is a lower stop member 52 which limits the downward movement of rod 34 against chamber 47 even as stops 48 and 49 limit the upward movement. If desired stops 49 and 52 may be provided with set screws or lock nuts to prevent misadjustment.

Mounted on sleeve 29 in a position behind and in front of pipe 31 are two pivots 53, and the two arms 54 of a bifurcated balance lever 56 are pivoted on said pivots. If necessary to adjust the balance of the balance arm, a movable weight 57 may be provided secured in a predetermined adjustable position by any suitable securing means, such as set screw 58.

Suspended from the right hand end of balance lever 54 is a balance tank or operating bucket 59. While other means may be employed, I prefer to reinforce the upper edge of bucket 59 with ring 61 and provide pivots 62 on each side of the bucket 59. Arms 54 are similarly provided with pivots 63 and pivots 62 and 63 are preferably connected by straps, or reins, 64 passing in the space between funnel 14 and tank 5 without contacting either.

The bottom of bucket 59 is provided with an outlet valve generally designated as 66 which valve will be described in more detail with reference to Figure 2. However, valve 66 has an operating foot 67 which is designed to contact bars 68 when the bucket 59 is lowered. Bars 68 are secured in the form of a grill to tank 5 by means of supporting members 69.

The common bottom 21 is provided with an outlet opening 71 and this outlet opening is controlled by a valve head 72. An inlet pipe 73 is provided for feeding mud to the device and said inlet pipe has a downwardly directed opening which is controlled by valve head 74. Valve heads 72 and 74 are shown as solid rubber balls of a moderate degree of softness, but need not necessarily be solid as toilet flush bowl valves of the usual hollow design have also been found to be satisfactory. The valve 72 is supported and controlled by rod 76, and valve 74 is supported and controlled by sleeve 77. Sleeve 77 is externally threaded at 78 and internally threaded at 79. A nut 81 is threaded on thread 78 and thread 79 is threaded on threads 82 of rod 76. The proper spacing of the valves obviously may be achieved by adjusting these various threads and nuts in addition lock nuts such as 83 may be provided and further adjustment of valve 72 may be obtained by threads 84 and nut 85. Various changes may be made without departing from the invention as for example in some instances sleeve 77 need not have internal threads 79, in which case nut 83 and gravity are relied on to space lower valve 72. Nut 81 rides on the top of lever 56 and sleeve 77 containing rod 76 passes through opening 86 in the lever 56.

As shown in Figure 1, valve 72 is closed and it is obvious that when bucket 59 goes down and the left side of lever 55 goes up that valve 74 will close pipe 73 while valve 72 will open opening 71. It should also be noted that threads 78 extend down into pipe 73 and receive therein a nut 87. Nut 87 may be positioned to pick up weighed sleeve 88 by means of the overhanging portion 89 at the proper moment that valve 72 is pulled off its seat and has thereby lost a good portion of the static head formerly holding it in place.

A spray pipe 91 is provided with outwardly directed orifices to spray the inner walls of chamber 13, and a spray pipe 92 is provided with two oppositely spaced orifices 93, which orifices 93 are directed to cause their spray to strike the displacement member 38 at a point adjacent the apex at its upper cone adjacent fastening means 41. Sprays 91 and 92 are not shut off during the normal operation of the device.

Figure 2:
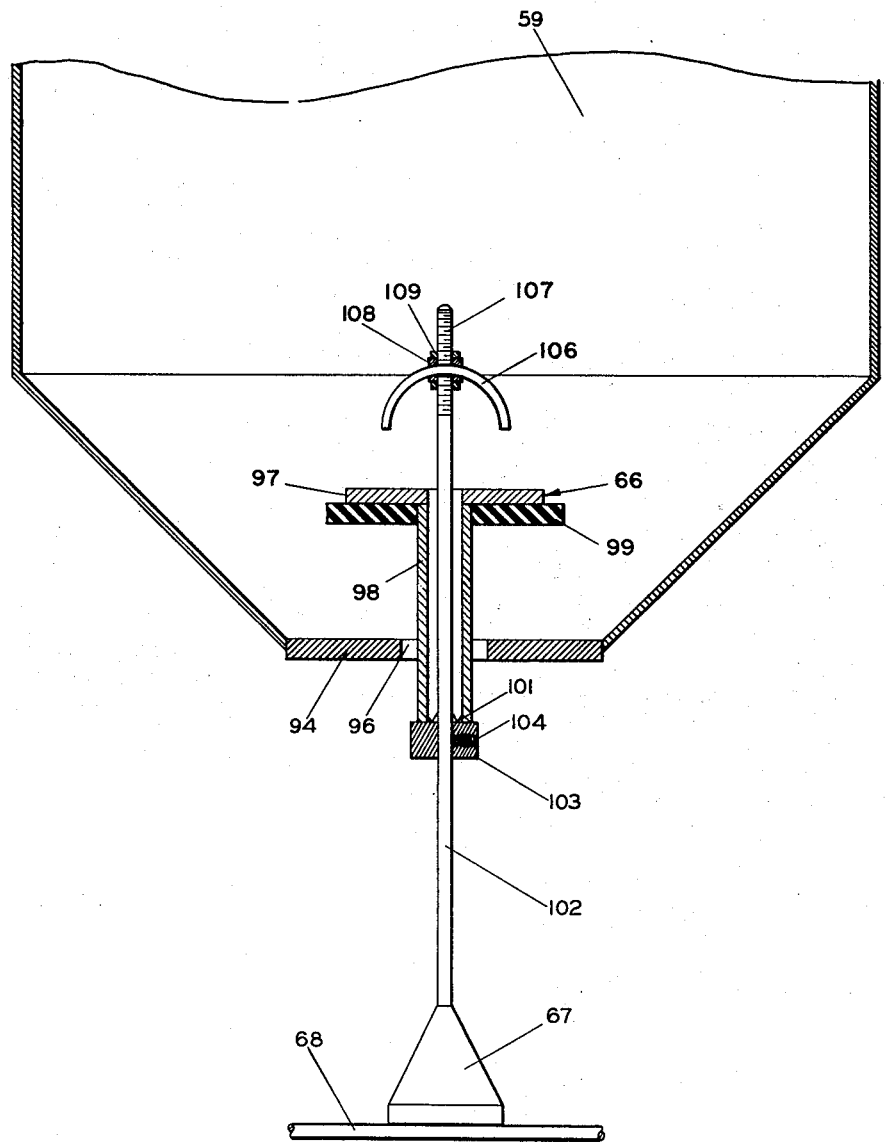
Figure 2 is an enlarged view of the lower part of the balance tank, or operating bucket, of Figure 1 showing the outlet valve in discharge position.

Figure 2 shows the lower portion of bucket 59 and valve 66 in more detail. While the bucket 59 could be made integral, I prefer to insert a thicker and more accurate valve seat 94 which is not subject to warping under strain. Seat 94 is provided with an outlet orifice 96 and a valve head 97. While valve head 97 can be made integral with sleeve 98, it is preferably secured by welding thereto as shown or any other means, such as threads. A rubber gasket or washer 99 is provided to give a better sealing action. The lower end of sleeve 98 is provided with notches 101 providing a castellated effect. Because of this castellated effect it will be noted that drilling mud can also flow between sleeve 98 and rod 102. Rod 102 may be provided with operating foot 67 so as to be sure to contact with at least one of rods 68. Rod 102 also has a collar 103 secured thereto by stop means such as a set screw 104 so that collar 103 may be positioned to open valve 66 in the proper position of bucket 59. In order to close valve 66 and also in order to not lose operating rod 102, rod 102 is provided with an upper stop member 106 which is preferably made in the form of a semicircular spring arm, as shown, in order to absorb some of the shock to bucket 59 when it picks up rod 102 and foot 67. Stop member 106 may be positioned in any suitable manner at the top of rod 102, such as by threads 107, upper and lower nuts 108 and lock nuts 109.

Figure 3 shows a plan sectional view of the structure shown in Figure 1 taken along the line 3—3 of Figure 1, looking downward. As such, many of the parts of the assembly 4 have the same numbers as in Figure 1 and therefore will only be discussed as may be necessary.

The drilling mud may come from any portion of the system (not shown), which consists of a mud pit and conduits leading to and from the well, but preferably the mud is taken from the mud returning to the surface in the well by means of a branch pipe 111 which is connected to the mud return pipe (not shown). Obviously all of the mud coming out of the well can not pass through the mud recording device in most instances, but pipe 111 may be designed by any means known in the prior art to take a substantially representative sample of the mud. Pipe 111 is provided with a valve 112 which may be throttled to control the flow of mud, but which valve is never shut off except at those rare intervals at which it is desired to completely clean the equipment, or to disconnect the same. Pipe 111 is connected to pipe 73 by means of a T 113, and T 113 is connected with clear water pipe 114, but except for complete clean outs (which occur only at very long intervals) fresh water cannot enter T 113 because valve 115 in pipe 114 is closed. Upstream of valve 115 in pipe 114 are T's 116 and 117. These T's are connected to pipes 91 and 92 by valves 118 and 119 respectively.

Valves 118 and 119 control the force of their respective sprays, such as 93, and generally remain set in one position as they run through all stages of the cycle of the operation. At the complete clean out period (which occurs at long intervals of time) they may be open a bit wider in order to increase the force of the spray if desired.

Because it is very important that the drilling mud does not stop flowing at any point in the system an orifice (not shown) is provided in pipe 73 constantly discharging mud 121 into chamber 12 at a varying rate throughout all cycles of operation. The size of this discharge 121 is regulated by a rotating valve member 122 which is provided with an adjusting handle 123 and suitable means for positioning it, such as slot 124 and set screw 126. Visible through the top of pipe 73 is sleeve 77 and rod 76 which are described with reference to Figure 1. The end of pipe 73 may be terminated by a bull plug, or other closure 127. An advantage of a removable closure 127 is that the device may be connected up by attaching mud pipe 111 in place of cap 127 and moving cap 127 over to attach to a nipple inserted in T 113 in place of pipe 111, thus changing the device from a "right handed" into a "left handed" device to suit the particular location, if needed.

*Operation*

The device 4 is attached by means of pipe 111 to a source of drilling mud and by pipe 114 to a source of relatively clear water. The relatively clear water can actually be fairly dirty, but still it is relatively clear compared to the mud.

The proper positions for valves 72, 74 and 66 may be adjusted before taking the device into the field by means of nuts 81, 83, 85, 104, 108, 109 and related parts. Stop members 48, 49 and 52 also may be adjusted before taking the instrument into the field.

Valve 115 is closed and valves 112, 118 and 119 are opened to the desired degree.

As the mud flows through line 111 into pipe 73 the discharge at 121 is regulated by moving handle 123 and setting set screw 126 so that there may be a constant flow of fair volume at all times in 73. Assume the device has taken the position shown in Figure 1 which it will take when empty. The mud pours out of pipe 73 into chamber 11 and is deflected from window 22 by means of ledge 23. As opening 71 is closed by valve 72 chambers 11 and 13 proceed to fill. At the same time spray 93 and the spray from 91 continue to wash down the displacement member 38 and the walls of the displacement member chamber 13.

The manner of filling chamber 13 with mud is very important because a quick upper travel of mud in chamber 13 will result in an overtravel upwardly of the displacement member 38 while if the mud is allowed to travel side ways into chamber 13 it will force displacement member 38 over against partition 18 resulting in friction and then the displacement member will not raise high enough.

Since it is not possible to reduce the filling velocity because this would unduly lengthen the cycle of operation and would tend to cause deposits of clay from the drilling mud in pipes 73 and 111, it is necessary to counteract the causes for overtravel and turbulence.

At first the mud flowing from 73 into chamber 11 passes under the lower edge of partition 17, but as only the lower conical type of member 38 projects into that portion of the device there is relatively small displacement side ways of member 38. The mud then raises in chamber 13 until the level of the mud reaches the bottom of window 22. By this time the member 38 has been buried deep enough to resist any side sway, but has been buoyed up a little. However, some time remains for the displacement member 38 to sink by gravity in the thick mud to overcome the buoying effect. As the mud rushes side ways from chamber 11 into chamber 13 through window 22 there is substantially little mud passing below partition 17 so there is no buoying effect on member 38. The lower edge of window 22 is high enough relative to member 38 so that member 38 has a larger portion anchored in substantially quiet mud in chamber 13 and so the mud coming in through window 22 can neither buoy up or displace side ways the member 38. The top of window 22 is designed to be below the top of partition 18 so that the mud flowing from chamber 16 down under edge 23 at the end of the filling cycle enters chamber 13 very quietly so that the instrument 27 can make a steady reading. During the time taken by this portion of the cycle the amount of water entering through spray 93 is negligible and does not effect the reading of the instrument within the degree of accuracy required. The same is true of water from spray 91 which along with the spray from 93 tends to stay on top of the mud but which also tends to stay over to the side of chamber 13.

At this point in the cycle as the drilling mud flows through funnel 14 into bucket 59 the recording instrument 27 has produced a dwell on the recorded curve which is easily recognized. The mud pouring into the bucket 59 soon fills the same and it will be noted by comparing Figures 1 and 2 that when valve 66 is closed there is still a considerable amount of mud passing down between sleeve 98 and rod 102. This mud prevents sleeve 66 from sticking in one position due to clay deposits.

When sufficient mud has been received in bucket 59 to overbalance weight 57, bucket 59 descends opening valve 66, into the positions shown in Figure 2. Bucket 59 then proceeds to empty both through space 96, outside sleeve 98 and through the space between sleeve 98 and rod 102 out through openings 101. In this way the possibility of clay deposits is avoided. While bucket 59 and valve 66 are in the position of Figure 2, valve 72 has been pulled off of its seat and valve 74 has closed mud inlet 73. Just as valve 72 was pulled off of its seat with a reduction of static head holding it down, nut 87 picked up additional weight 88, which weight was insufficient to overbalance bucket 59, but was sufficient to prevent serious slamming of the apparatus caused by the lost static head on valve 72 when it opened.

Valve 74 closing mud pipe 73 would tend to make the mud flow out past 87 through the top of 73, but valve 112 and valve 122 are so set that the mud does not raise over the top of 73 but passes down through chamber 12 behind partition 16 and then out hole 20 (Figure 1) through bottom 21 into space 15 and out pipe 9. However if some of the mud does come up out of the top of 73 it will not do any substantial damage except to slightly accelerate the time at which the entire system needs cleaning in order to preserve its accuracy and to delay the emptying operation somewhat of 11 and 13.

As the mud drains out of chamber 13 the walls of the chamber are washed down by clear water spray from 91 and the displacement member 38 is washed by spray 93 from pipe 92. About the time chambers 11 and 12 and 13 have become substantially empty, bucket 59 will have lost so much mud that weight 57 will overbalance the system and move the device into the position of Figure 1 whereupon the cycle will be repeated.

While the present invention with its numerous features such as sprays 91 and 92, passage 101 and continual mud discharge 121 and other features described above will cause the mud weighing machine 4 to operate automatically without any attention or cleaning for long periods of time it is obvious that once in a great while (the time depending upon the type of mud) it is necessary to give the device a more thorough cleaning than is provided by sprays 91 and 92. At such times valve 112 is closed and valves 115, 118, 119 are open wide so that clear water runs through T 113 and pipe 73 coming out around valve 74 and the discharge 121. The device will go through the same cycles with water as with mud and a few such cycles will suffice to clean the apparatus thoroughly. However, if desired, this cleaning may be supplemented by brushing with a suitable brush, and for this purpose funnel 14 is made readily removable by rotating it counterclockwise and raising it, after which all parts are readily accessible to a brush. When the device is filled with fresh water a calibration check may be obtained to see if the density recording is still correct. A number of these devices shown as the preferred embodiment in the drawing are now being used in the field and have proved to be highly successful and a great improvement over the devices of the prior art.

The shape of parts 38, 73 and 74 is preferred because such rounded or streamlined parts do not accumulate cakes of mud as easily as other shaped parts will. However, anyone satisfied with less perfect performance could modify them without departing entirely from the invention. Numerous other conventional changes in size, shape or arrangement of parts may be made without departing from the spirit and substance of the present invention as defined in the following claims.

Having described my invention, I claim:

1. In a device for recording the density of drilling mud having a first tank wherein a sample of said mud is accumulated, displacement means within said first tank for measuring the density of the sample, said displacement means having generally conically-shaped ends and being vertically disposed in said first tank in such a manner that one of said conically-shaped ends is disposed above the other, recording means responsive to the displacement of said displacement member, a beam pivotally mounted above said first tank, a second tank suspended from said beam and positioned to catch an overflow of said mud from said first tank, and valve means operatively connected to said beam to control the filling of said first tank, the improvement comprising an imperforate partition in said first tank between said displacement means and said valve means, said partition extending down below the major portion of said displacement means a sufficient distance to insure said displacement member remaining away from the wall of said first tank as mud from said valve means sweeps under said partition, and said partition extending up above the major portion but below the upper conically-shaped end of said displacement means to insure said displacement member remaining away from the wall of said first tank while mud from said valve means sweeps across the top of said partition and said displacement member takes its proper vertical position, and a second partition in said first tank between said displacement means and said valve means extending down to a point below the level of overflow but above said displacement member to insure the stilling of the surface of said mud around said displacement member while the degree of submergence of said displacement means insures its proper vertical position, there being sufficient space between the top of said first partition and the bottom of said second partition to allow for the entire flow of mud from said valve means.

2. In a device for recording the density of drilling mud having a first tank wherein a sample of said mud is accumulated, displacement means within said first tank for measuring the density of the sample, said displacement means having generally conically-shaped ends and being vertically disposed in said first tank in such a manner that one of said conically-shaped ends is disposed above the other, recording means responsive to the displacement of said displacement member for recording said density, a beam pivotally mounted above said first tank, a second tank suspended from said beam and positioned to catch an overflow of said mud from said first tank, and valve means operatively connected to said beam to control the filling of said first tank, the improvement comprising an imperforate partition in said first tank between said displacement means and said valve means, said partition extending down below the major portion of said displacement means a sufficient distance to insure said displacement member remaining away from the wall of said first tank as mud from said valve means sweeps under said partition, and said partition extending up above the major portion but below the upper conically-shaped end of said displacement means to insure said displacement member remaining away from the wall of said first tank while mud from said valve means sweeps across the top of said partition and said displacement member takes its proper vertical position.

3. A device according to claim 2 wherein said second tank contains a liquid dumping device adapted to open and close in a discharge outlet in the bottom of said second tank which comprises a valve stem, a closure unit slidably mounted on said stem and adapted to seat in said outlet and close the same, said closure unit having an opening therethrough of greater cross section than the valve stem, leaving sufficient clearance through which the fluid continuously flows thereby lubricating the moving parts of said dumping device, a stop on said stem adapted to engage said closure unit, and means for effecting relative movement between said tank and said valve stem.

4. In a device for recording the density of drilling mud having a first tank wherein a sample of said mud is accumulated, displacement means within said first tank for measuring the density of the sample, recording means responsive to the displacement of said displacement member for recording said density, a beam pivotally mounted above said first tank, a second tank suspended from said beam and positioned to catch an overflow of said mud from said first tank, and valve means operatively connected to said beam to control the filling of said first tank, the improvement comprising a drain valve for said first tank operatively connected to said beam by a valve stem, and a weight slidably mounted on said stem, said weight resting on a stop when said drain valve is closed and adapted to be engaged by a stop on said stem when said drain valve is open to add weight to said beam to compensate for the static head formerly holding said drain valve shut.

5. A device according to claim 4 wherein said second tank contains a liquid dumping device adapted to open and close in a discharge outlet in the bottom of said second tank which comprises, in combination, a valve seat, a valve head disposed to close against said seat, said valve head having an opening therethrough extending from one side of said valve seat to the other, a valve operating rod extending through said opening in said valve head, stops on said rod above and below said valve head engaging the same, said rod being sufficiently smaller in diameter than the opening in said head to permit a fluid to flow through said valve head whereby deposits of solid material from said fluid flowing through said valve head and consequent sticking of said dump valve are substantially reduced.

6. An improved mud weighing device comprising, in combination, a tank having a mud inlet and a mud outlet, an elongated displacement member having generally conical ends suspended vertically into said tank for measuring the density of said mud, a vertical imperforate partition in said tank between said mud inlet and said displacement member dividing said tank into two compartments, said partition having a lower opening opposite a lower portion of said displacement member and a middle opening opposite an upper portion of said displacement member, thereby establishing communication between the two compartments, and means for closing and opening said mud outlet for filling and emptying said tank.

7. A device for measuring the density of a drilling mud comprising, in combination, a first tank wherein a sample of mud is accumulated, displacement means within a first sector of said first tank for measuring the density of the sample, said displacement means having generally conically-shaped ends and being vertically disposed in said first tank in such a manner that one of said conically-shaped ends is disposed above the other, a beam pivotally mounted above said first tank, a second tank suspended from said beam and positioned to catch an overflow of said mud from said first tank, valve means operatively connected to said beam to control the filling of said first tank, said valve means discharging into a second sector of said first tank adjacent to but laterally removed from said first sector, a vertically disposed imperforate partition in said first tank extending thereacross to divide said first tank into said first and second sectors, said partition extending downwardly towards but not to the bottom of said first tank a distance such that its lower edge is below that portion of said displacement means having the largest cross-sectional area in a plane perpendicular to its vertical axis, and said partition extending upwardly towards but not to the top of said first tank a distance such that its upper edge is above that portion of said displacement means having said largest cross-sectional area whereby mud flowing below said partition from said first sector into said second sector contacts during its lateral flow only that portion of said displacement means having a small resistance thereto thereby avoiding any substantial misalignment of said displacement means from its proper vertical position.

8. A device according to claim 7 wherein said second tank contains a liquid dumping device adapted to open and close in a discharge outlet in the bottom of said second tank which comprises a valve supporting member positioned above said discharge outlet in said second tank, a valve stem extending vertically downward from said supporting member through said discharge outlet, an outlet closure member slidably mounted on said stem and adapted to seat in and close said discharge outlet, said closure member having an opening therethrough of greater cross section than that of the stem on which it slides, thereby forming an annular space through which fluid can continuously flow from said second tank, and a stop at the end of said stem adapted to engage said plug when relative movement occurs between said valve stem and said tank.

JOHN R. PETTIGROVE.

REFERENCES CITED

The following references are of record in the file of this patent:

UNITED STATES PATENTS

| Number | Name | Date |
| --- | --- | --- |
| 2,252,014 | Lupfer | Aug. 12, 1941 |
| 2,285,586 | Kerr | June 9, 1942 |
| 2,360,977 | Pettigrove | Oct. 24, 1944 |

FOREIGN PATENTS

| Number | Country | Date |
| --- | --- | --- |
| 690,716 | France | June 24, 1930 |